United States Patent [19]

Adams

[11] 4,349,599

[45] Sep. 14, 1982

[54] ADHESIVE TAPES

[75] Inventor: Alfred A. Adams, Bungay, England

[73] Assignee: Crystic Systems Limited, Northamptonshire, England

[21] Appl. No.: 40,915

[22] Filed: May 21, 1979

[30] Foreign Application Priority Data

May 23, 1978 [GB] United Kingdom ............... 21708/78

[51] Int. Cl.$^3$ .............................................. B32B 5/02
[52] U.S. Cl. .................... 428/233; 156/242; 156/245; 264/135; 264/328.1; 428/224; 428/251; 428/285; 428/286; 428/287; 428/343; 428/354
[58] Field of Search ............... 428/245, 246, 251, 252, 428/260, 262, 265, 268, 285, 286, 287, 290, 247, 343, 354, 233; 264/113, 128, 135, 174, 328.1; 156/242, 245

[56] References Cited

U.S. PATENT DOCUMENTS

| 2,477,407 | 7/1949 | Grant et al. | 428/251 |
| 3,041,217 | 6/1962 | Fennebresque | 428/251 |
| 3,814,658 | 6/1974 | Decker | 428/252 |
| 4,061,817 | 12/1977 | Maxel | 156/245 |
| 4,107,370 | 8/1978 | Ingraham | 428/251 |
| 4,137,618 | 2/1979 | Krauss | 264/135 |
| 4,139,591 | 2/1979 | Juresich | 428/251 |
| 4,157,931 | 6/1979 | Bricot et al. | 156/242 |
| 4,186,235 | 1/1980 | Bramwell | 428/286 |
| 4,304,813 | 12/1981 | Elmore | 428/257 |

FOREIGN PATENT DOCUMENTS

| 846020 | 8/1960 | United Kingdom . |
| 884468 | 12/1961 | United Kingdom . |
| 1167403 | 10/1969 | United Kingdom . |
| 1329094 | 9/1973 | United Kingdom . |

Primary Examiner—James J. Bell
Attorney, Agent, or Firm—Pearne, Gordon, Sessions, McCoy & Granger

[57] ABSTRACT

A textile, such as a tape, having an adhesive coating on one or both of its surfaces is used to prevent movement of reinforcing material, usually glass fiber, from a position in a mould during the manufacture of plastics articles.

The adhesive is preferably permanently tacky and is selected to be compatible with plastics material used to form the articles since the textile is incorporated in the finished plastics articles. An adhesive based on an ethylene/vinyl acetate copolymer pressure-sensitive adhesive is disclosed as being suitable for use with an unsaturated polyester.

8 Claims, No Drawings

ADHESIVE TAPES

FIELD OF THE INVENTION

The invention relates to adhesive textiles and their particular application to processes of making reinforced plastics articles.

BACKGROUND OF THE INVENTION

Articles made from reinforced plastics can be formed by a number of processes. For example glass reinforced polyester articles can be produced by a variety of well known methods, such as hand lay-up, spray-up, resin injection, vacuum impregnation, cold press moulding, filament winding and hot press moulding.

Glass fibre is the commonest reinforcement, but other fibres both natural and synthetic, mineral or organic can be used, such as asbestos, carbon fibre, sisal or polyester.

The usual matrix is an unsaturated polyester resin, but epoxy or vinyl ester resins or other resin capable of curing at low temperatures by an addition mechanism are also used.

In these mouldings it is often desired to locate extra reinforcement or inserts in specific places so that added strength added stiffness or fixing points are provided. This is sometimes difficult as the reinforcement can move during the moulding process either during preparation, through mould closure or by flow of the resin.

SUMMARY OF THE INVENTION

I have now found that this problem can be overcome by the use of a textile with adhesive on at least one side, the adhesive being compatible with the laminating resin. This material, for example, in the form of a tape, can be used to stick two pieces of reinforcement together or to anchor a piece of reinforcement or an insert to a particular area of the moulding.

The textile can be in the form of a fabric, tape, woven roving, needleloom, tissue, paper etc. ans whilst commonly of glass fibres, can also be made of other mineral or organic fibres both natural and synthetic, e.g. asbestos, carbon, or Dynel(Registered Trade Mark).

The adhesive composition used must be compatible with the laminating resin so that it becomes an integral part of the structure without adversely affecting its performance. For example a coating of a pressure sensitive hot melt adhesive based on an ethylene/vinyl acetate copolymer is suitable when the laminating resin is an unsaturated polyester. It is desirable that the adhesive should be tacky or in some other way function to hold the textile and the surface to which it is applied immediately these are put in contact.

DESCRIPTION OF PREFERRED EMBODIMENTS

By way of illustration the following examples are given.

EXAMPLE 1

A U shaped moulding was required with extra strength in the trough portion. A layer of glass mat reinforcement was placed on a male mould and the pieces of mat were taped together with short lengths (ca 15 cm) of a 50 mm wide glass fibre tape with a pressure-sensitive tacky adhesive layer on one side. The adhesive is based on an acrylate polymer. The requisite size area of woven glass roving reinforcement material was placed at the apex of the male mould and taped in place by the same means. A further layer of glass mat was placed on top and again taped in place by similar techniques. The female mould was then placed on top of the male mould, clamped in place and the requisite amount of catalysed and accelerated unsaturated polyester resins injected into the cavity. After the resin had gelled the mould was opened and the moulding released had the required resin/glass ratio in all areas. An acrylate-based adhesive would also be suitable when the resin is a vinyl ester or an epoxide.

When a similar moulding was made without the use of the adhesive glass tape a very variable resin/glass ratio was obtained due to the movement of the reinforcement during the closing of the mould and the subsequent injection of the resin.

EXAMPLE 2

In the manufacture of a boat hull by the spraying of resin and glass, an area of rigid polyurethane foam was required to give the requisite properties. After applying a gel coat and the first layer of glass and polyester resin to the mould followed by consolidation the sections of foam were stuck in place by means of pieces of glass tape coated with a pressure-sensitive polyvinyl acetate copolymer-based adhesive. A further layer of glass and resin were sprayed up and consolidated. The pieces of glass tape that were used to keep the foam in place became an integral part of the final moulding.

Other adhesive systems are based on natural or synthetic rubbers and polyvinyl ethers and are suitable for use with unsaturated polyester, vinyl ester or epoxide resins.

I claim:

1. In a reinforced plastics article comprising fiber reinforcement and a plastic impregnant, the improvement comprising providing a textile, selecting as an adhesive on at least one of the surfaces of said textile an adhesive compatible with the plastics material, the textile holding the reinforcement of the article in position during impregnation of the reinforcement by the plastics, and being incorporated with the reinforcement into the finished article.

2. The improvement according to claim 1, wherein both surfaces of the textile have the said adhesive.

3. In a method of manufacturing a reinforced plastics article by positioning reinforcing material in a mould and subsequently introducing plastics material into the mould, the improvement comprising providing a textile material having an adhesive on at least one of its surfaces, said adhesive being compatible with the plastics material, applying said textile material to at least one piece of reinforcing material positioned in said mould to hold said reinforcing material in place during introduction of plastics material into the mould.

4. A textile according to claim 1 or claim 2, wherein the adhesive is an ethylene/vinyl acetate copolymer.

5. A textile according to claim 1 or claim 2, wherein the adhesive is a pressure-sensitive hot melt adhesive.

6. The improved method as claimed in claim 3 wherein the said textile is used to maintain reinforcement in position on a male mould part during impregnation of the reinforcement by curable plastics resin material.

7. The improved method as claimed in claim 6 wherein the impregnation takes place inside a closed mould.

8. The improved method as claimed in claim 3 wherein the adhesive is a tacky ethylene/vinyl acetate copolymer and the plastics material is a polyester resin.

* * * * *